United States Patent [19]

Yumura et al.

[11] Patent Number: 5,079,660
[45] Date of Patent: Jan. 7, 1992

[54] MAGNETIC HEAD SUSPENSION ASSEMBLY FOR REDUCING VIBRATION EFFECTS

[75] Inventors: Takashi Yumura; Tetsu Yamamoto; Takaharu Ueda; Mayumi Nakazawa; Shigeki Mizuno, all of Amagasaki, Japan

[73] Assignee: Mitsubishi Denki Kabushiki Kaisha, Tokyo, Japan

[21] Appl. No.: 374,237

[22] Filed: Jun. 29, 1989

[30] Foreign Application Priority Data

Jul. 5, 1988 [JP] Japan .................................. 63-168476
Jul. 5, 1988 [JP] Japan .................................. 63-168477

[51] Int. Cl.$^5$ .............................................. G11B 5/48
[52] U.S. Cl. .................................................. 360/104
[58] Field of Search ............... 360/104, 102, 103, 105, 360/106

[56] References Cited

FOREIGN PATENT DOCUMENTS

| 0022827 | 5/1983 | Japan . | |
| 0192081 | 8/1986 | Japan . | |
| 0204876 | 9/1986 | Japan | 360/104 |
| 0065275 | 3/1987 | Japan | 360/104 |
| 0055767 | 3/1988 | Japan | 360/104 |
| 0225981 | 9/1988 | Japan | 360/104 |
| 0070977 | 3/1989 | Japan | 360/104 |

Primary Examiner—Andrew L. Sniezek
Attorney, Agent, or Firm—Wolf, Greenfield & Sacks

[57] ABSTRACT

An in-line type magnetic head supporting apparatus of the present invention including a first fixed part secured to a magnetic head slider mounted with a magnetic head in a floatable manner, a second fixed part secured to a load beam which presses the magnetic head slider toward the magnetic disc, and a gimbal mechanism comprising a spring part connecting the first and second fixed parts and enabling the pitching and rolling movements of the magnetic head slider in the radial direction of the magnetic disc, and further includes a restricting mechanism for preventing the sideslip of a pivot formed on the first fixed part as a fulcrum for pitching and rolling movements. Furthermore, in order to increase the flexural rigidity of the spring part of the gimbal mechanism in the radial direction, its lateral length is enlarged and slits are formed in the spring part to reduce the torsional rigidity thereby to prevent the inteference of the pitching and rolling movements.

1 Claim, 14 Drawing Sheets

MAGNETIC HEAD SUSPENSION ASSEMBLY FOR REDUCING VIBRATION EFFECTS

BACKGROUND OF THE INVENTION

1. Field of the Invention

The present invention generally relates to a supporting apparatus for supporting a magnetic head slider in a floating manner relative to a magnetic disc, and more particularly, it relates to an in-line type magnetic head supporting apparatus so constructed that a longitudinal direction of a load beam of a head supporting mechanism coincides with the circumferential direction of the disc.

2. Description of Related Art

In a magnetic head slider used in a magnetic disc system, in order to read data accurately, the attitude of the magnetic head slider must follow dynamic displacements of the magnetic disc such as surface vibrations generated at the rotating movement. To this end, an arrangement has been conventionally disclosed, for example, in Japanese Patent Publication No. 22827/1983. FIG. 1 is a perspective view showing a general magnetic head supporting apparatus, and FIG. 2 is an exploded perspective view showing essential portions of a prior art magnetic head supporting apparatus. In FIGS. 1 and 2, numerals 1 through 7 indicate a magnetic head slider mounted with a magnetic head (not shown), 2 a gimbal mechanism, 2a a U-shaped spring part of the gimbal mechanism, 3 a magnetic disc, 4 a load beam, 5 a first fixed part secured to the magnetic head slider 1, 6 a second fixed part secured to the load beam 4 of the gimbal mechanism and 7 a pivot which is a convex portion and formed in the first fixed part 5, respectively. The load beam 4 is in contact with the pivot 7 at a contact point 4a. Also, in FIGS. 1 and 2, a direction X shows the radial direction of the magnetic disc 3, a direction Y indicating the circumferential direction thereof, while a direction Z is a pressing direction to which the magnetic head slider 1 is pressed against the magnetic disc 3, and is orthogonal to the directions X and Y. An arrow A indicates the rotating direction of the magnetic disc 3 and an arrow B represents the moving direction of the magnetic head. The load beam 4 is elongated in the circumferential direction of the magnetic disc 3 or in the direction Y, pressing the magnetic head slider 1 via the pivot 7 of the gimbal mechanism 2 toward the magnetic disc 3, that is, in the direction Z. The gimbal mechanism 2 is, for example, bonded to the magnetic head slider 1 at the first fixed part 5. Also, the second fixed part 6 on the rear end of the gimbal mechanism 2 is secured to the load beam 4 through bonding by, such as, spot welding or the like.

The magnetic disc 3 is rotated in a direction shown by the arrow A and the magnetic head slider 1 is moved in a direction shown by the arrow B. The magnetic head slider 1 is supported by the gimbal mechanism 2 for pitching and rolling movements in the radial (X-axis) and circumferential (Y-axis) directions of the magnetic disc 3, and so constructed as to let the attitude these of follow dynamic variations of the magnetic disc 3. When the magnetic disc 3 is rotated, an air spring actuated by the air flowing in between the magnetic disc 3 and the magnetic head slider 1 is produced. In order to place or add a load necessary to maintain the balance of force with the air spring onto the magnetic head slider 1, the load beam 4 is in contact with the pivot 7 at the contact point 4a thereby to press the magnetic head slider 1.

Since the prior art magnetic head supporting apparatus is constructed as mentioned hereinabove and when the magnetic head slider 1 is moved at high speeds, for example, in the direction B, the gimbal mechanism 2 experiences added pressure in the direction X, resulting in deformation of a spring part 2a of the gimbal mechanism 2. FIG. 3 is a plan view showing an example of the deformation of the spring part 2a of the gimbal mechanism 2, in which a solid line indicates the deformed gimbal mechanism and a broken line shows the normal one. Since the pressure in the direction X is applied directly to the pivot 7 which is the contact point with the load beam 4, the spring part 2a is deformed, causing the pivot 7 to slip sideways in the direction X. FIG. 4 is a graph showing an acceleration transmission function of the magnetic head slider 1 in the direction X with respect to the driving force of the magnetic head supporting apparatus using a deformed gimbal mechanism 2, in which X-axis designates the frequency (kHz) of the driving force. Y-axis indicates the phase (degree) in FIG. 4(a) and the gain (dB) in FIG. 4(b) respectively. As shown in FIG. 4, a resonance peak in the bending mode of the gimbal mechanism 2 in the direction X is found at the frequencies of 1.7 kHz to 2.1 kHz. Therefore, the conventional apparatus encounters such problems that the driving force is not transmitted correctly and a positioning control system becomes unstable. It is to be understood that the aforesaid frequency varies depending on the size of the head and the construction of a suspension.

For preventing the sideslip of the pivot 7 referred to above, a prior art has been disclosed in Japanese Patent Application Laid-Open No. 65275/1987. In this invention, in order to prevent the abrasion of the pivot of the right angle type magnetic head in which the load beam is elongated in the radial direction of the magnetic disc, a dimple having a radius of curvature larger than that of the pivot and a depth not exceeding the projected height thereof is formed at the contact point of the load beam with the pivot.

In the aforementioned prior art, however, it is annoying to form the dimple in the load beam. Moreover, in the right angle type magnetic head supporting apparatus, though the sideslip may be prevented by the dimple since the bending moment applied to the gimbal mechanism is smaller, in case of the in-line type, the large bending moment is applied to the gimbal mechanism, which makes it difficult to prevent the sideslip of the pivot.

As shown in FIG. 5, when the first fixed part 5 secured to the magnetic head slider 1 is pressed out by pressing, since it is not on the same plane as the other surface of the gimbal mechanism, an application of force in the direction X results in the fact that the spring part 2a between the first and second fixed parts 5, 6 is exposed to the torsional force and bent to be weak in the direction X.

Accordingly, it was problematic that characteristics at positioning of the magnetic head slider 1 are badly influenced.

SUMMARY OF THE INVENTION

The present invention has been devised to solve the aforementioned problems, and therefore, it is a primary object of the present invention to provide a magnetic head supporting apparatus having enhanced flexural rigidity of a spring part of a gimbal mechanism in the positioning direction and stabilized dynamic characteristic, without interfering pitching and rolling movements of a magnetic head slider about X and Y-axes, by increasing the width of respective side pieces of the spring part and forming slits therein.

It is another object of the present invention to provide a magnetic head supporting apparatus having enhanced flexural rigidity of a spring part of a gimbal mechanism in the positioning direction and stabilized dynamic characteristic, without interfering pitching and rolling movements of a magnetic head slider about X and Y-axes, by arranging first and second fixed parts on the same plane and rendering the thickness of a portion of the magnetic head slider opposite to the spring part smaller than that of a portion of the slider where the first fixed part is secured.

It is a further object of the present invention to provide a magnetic head supporting apparatus having stable dynamic characteristic, in which a load beam opposite to a pivot or the pivot is provided with a restricting means, so that pitching and rolling movements of a magnetic head slider about X and Y axes are not interfered, and the pivot is prevented from slipping sideways in the moving direction of the magnetic head slider even when the slider is moved at high speeds.

The above and further objects and features of the invention will more fully be apparent from the following detailed description with accompanying drawings.

DESCRIPTION OF THE PREFERRED EMBODIMENTS

Figure 1:
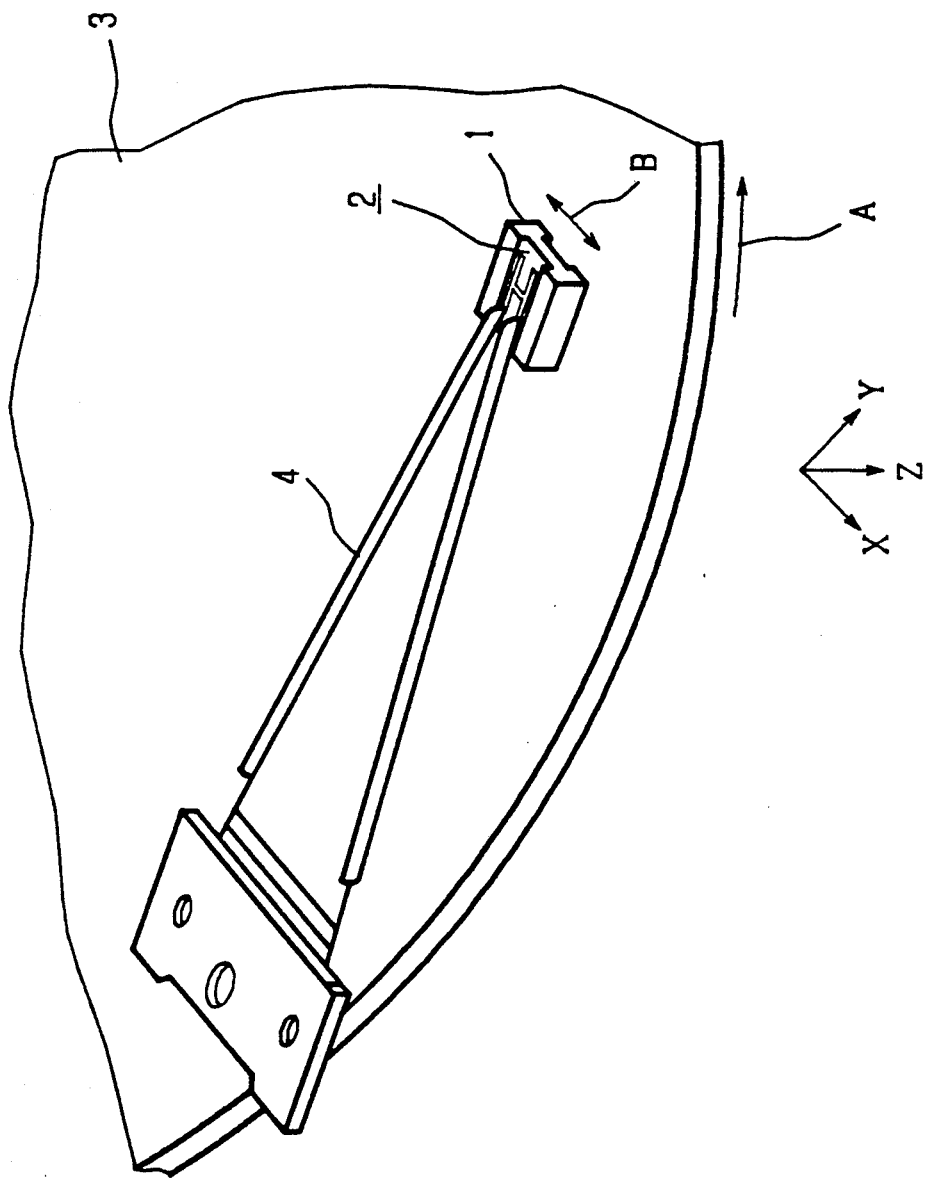
FIG. 1 is a perspective view showing a general magnetic head supporting apparatus.
Figure 2:
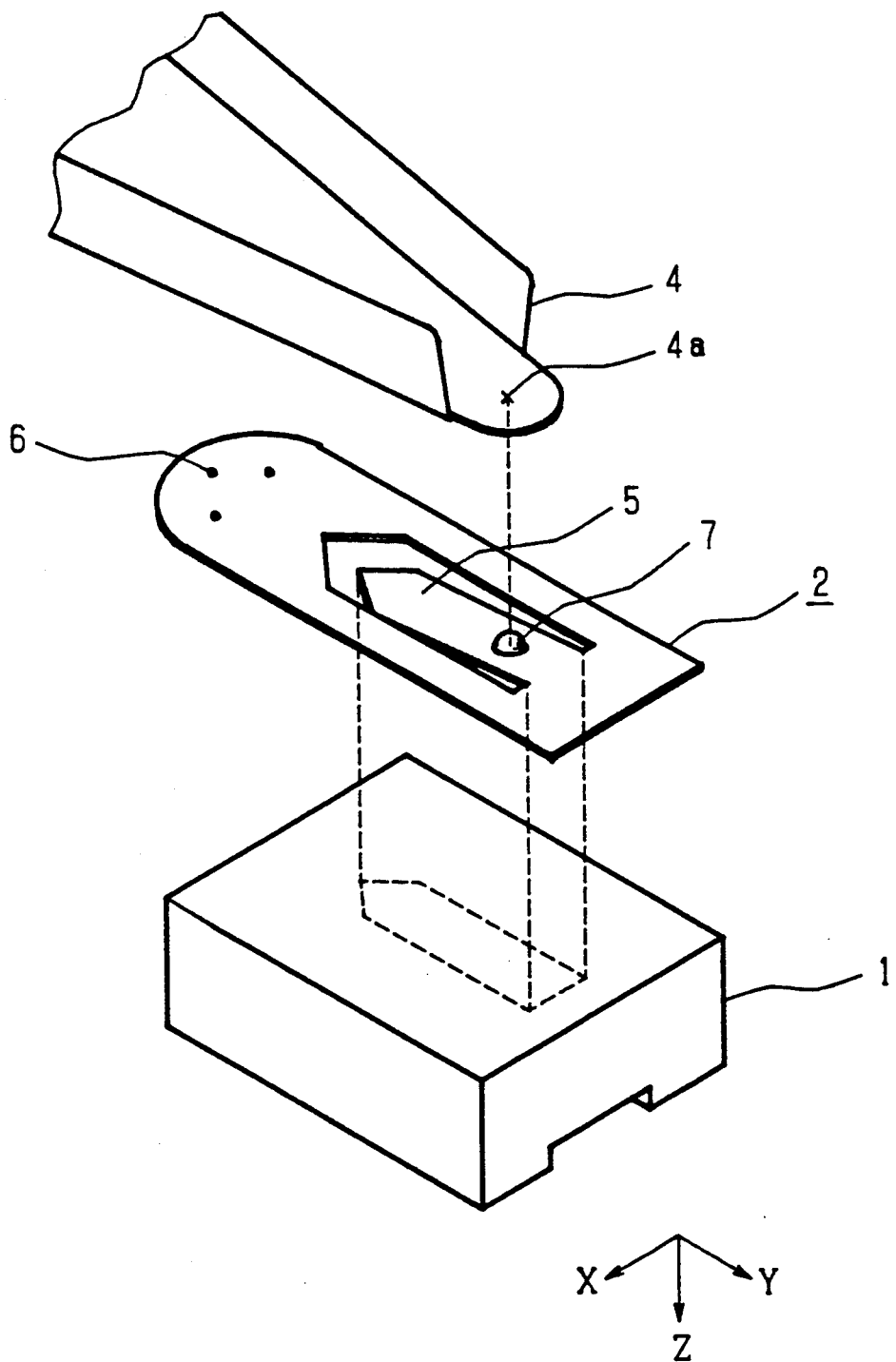
FIG. 2 is an exploded perspective view showing essential portions of a prior art magnetic head supporting apparatus.
Figure 3:
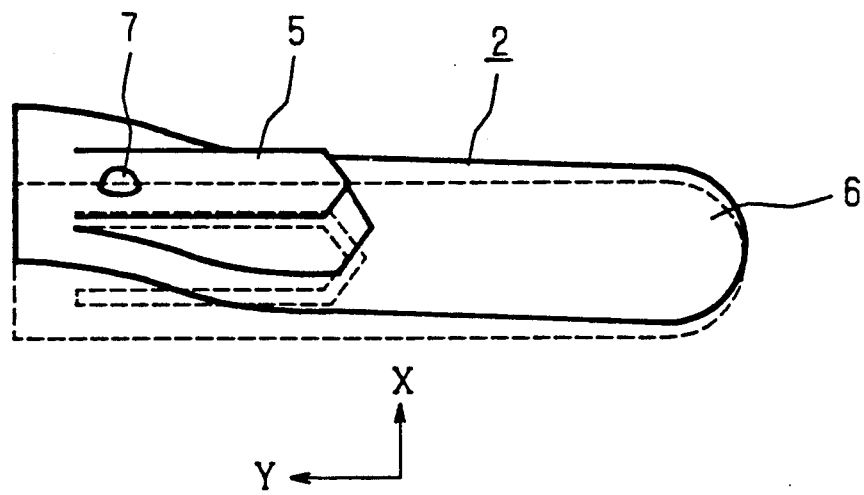
FIG. 3 is an explanatory view showing an example of a deformed gimbal mechanism in a prior art magnetic head supporting apparatus.
Figure 4A:
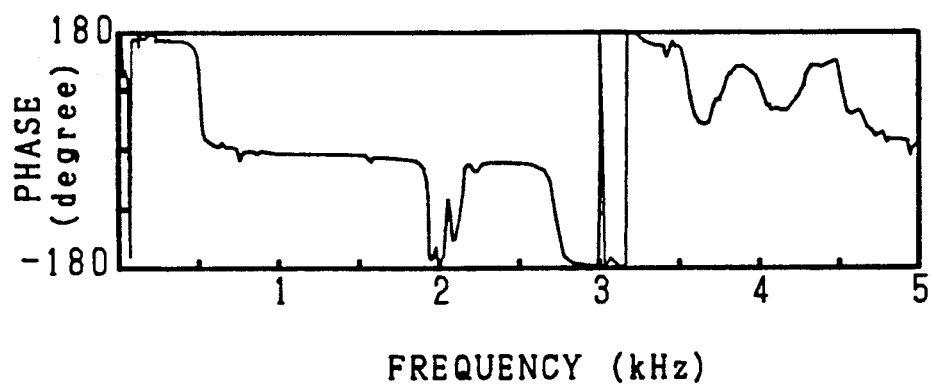
FIGS. 4(a) and 4(b) are graphs respectively showing phases of an acceleration transmission function in the moving direction of a magnetic head slider with respect to the frequencies, and gains with respect to the frequencies in a prior art magnetic head supporting apparatus.
Figure 4B:
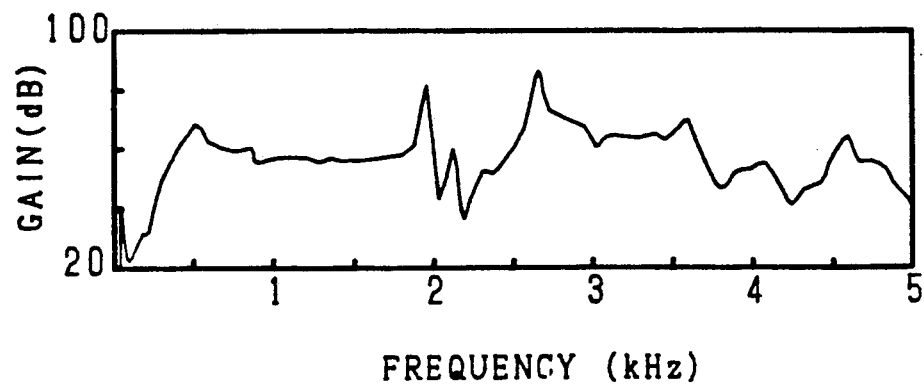
Figure 6:
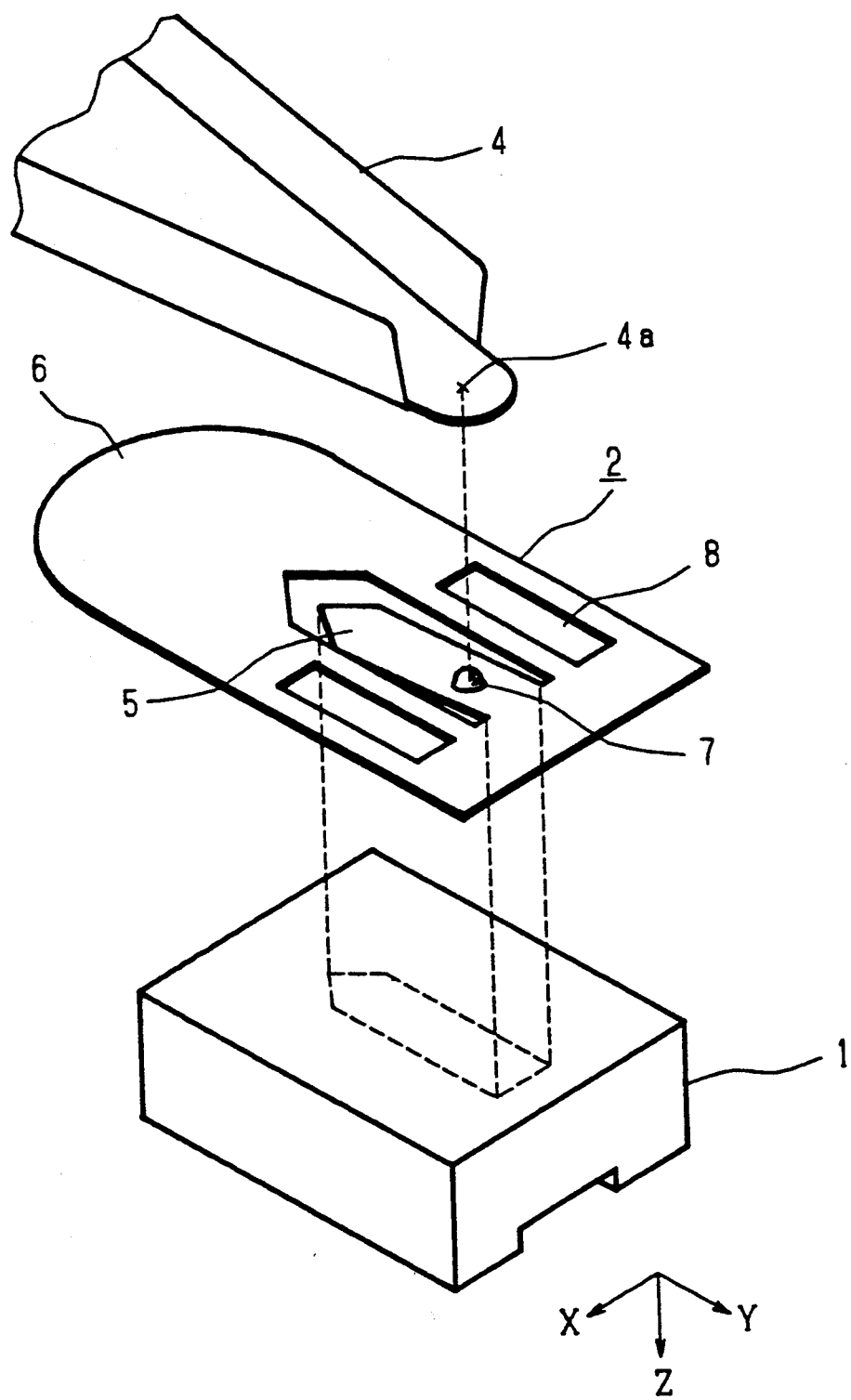
FIG. 6 is an exploded perspective view of essential portions of a magnetic head supporting apparatus according to one embodiment of the present invention wherein the essential portions are enlarged and exploded in a direction perpendicular to the magnetic disc surface.

In the following, preferred embodiments of the present invention will be described with reference to the drawings. FIG. 6 is an exploded perspective view showing essential portions of a magnetic head supporting apparatus according to one embodiment of the present invention, in which the essential portions are enlarged and exploded in a direction perpendicular to the magnetic disc surface. Referring to FIG. 1, a gimbal mechanism 2 is so arranged to have a wider width as to make a conventional sectional secondary bending moment in the direction X several times larger, and in the present embodiment, the width of the gimbal mechanism 2 used is about 3 mm + several 100 μm in the direction X. Accordingly, the width of the gimbal mechanism 2 is about several 100 μm larger than that of the prior art. Slits 8 are formed in a spring part 2a between a first fixed part 5 and a second fixed part 6. The slits 8 are provided so as to restrict the increase of the torsional rigidity resulting from the increase in the width of the spring part 2a of the gimbal mechanism 2, and accordingly the torsional force is kept substantially the same level as in the prior art.

Figure 7:
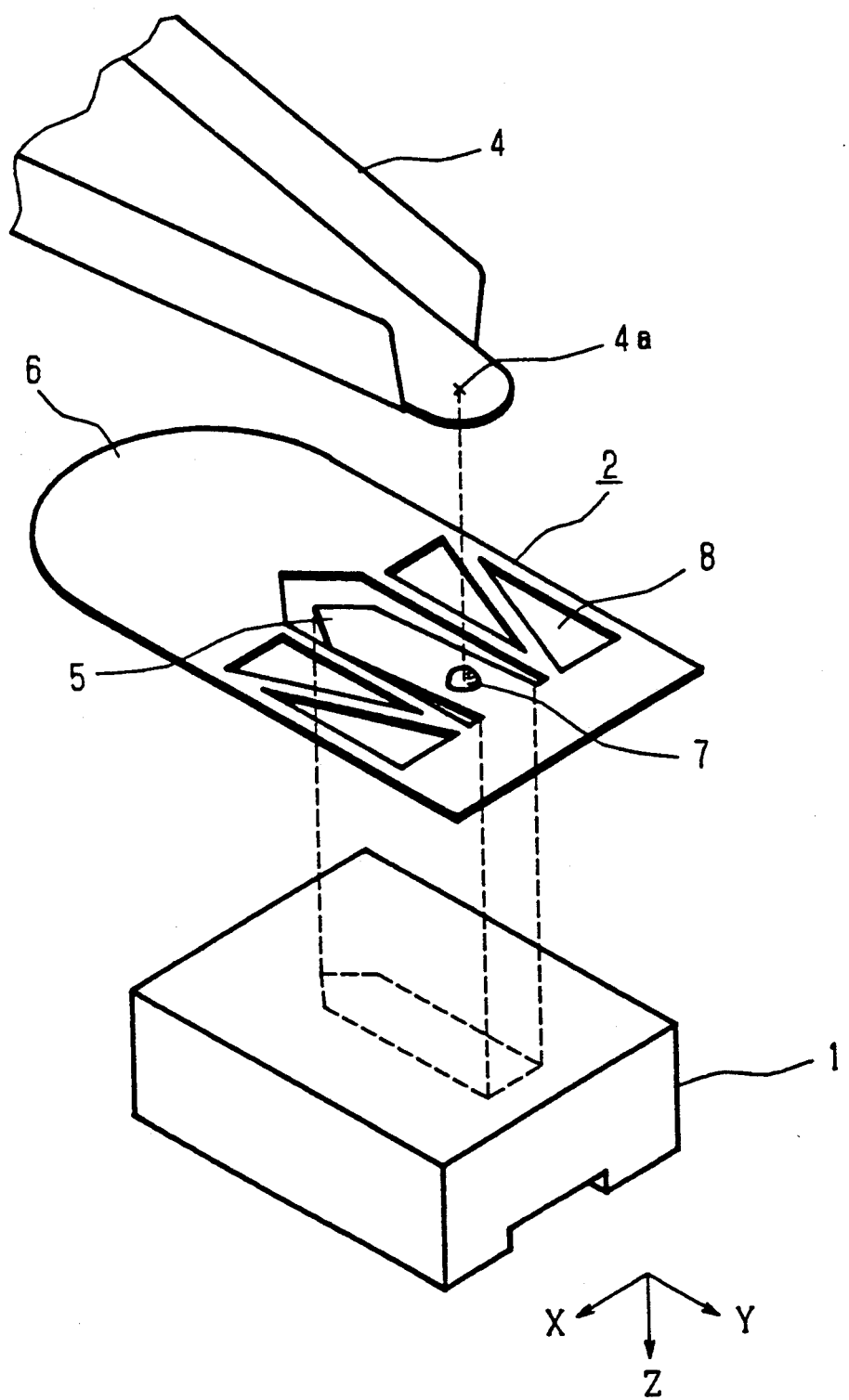
FIG. 7 is an exploded perspective view showing essential portions of a modified magnetic head supporting apparatus according to the one embodiment of the present invention.

In the gimbal mechanism 2 of the present embodiment, in order to increase the flexural rigidity in the positioning direction without interfering with the pitching and rolling movements of a magnetic head slider 1 about X and Y-axes, as shown in FIG. 6, the width of the spring part 2a which supports the pitching and rolling movements of the slider 1 is increased in the direction X, and the sectional secondary bending moment in the direction X is increased. Furthermore, the slits 8 are formed in the spring part 2a to reduce the torsional rigidity so that flexible pitching and rolling movements can be achieved. As a result, a stable magnetic head supporting apparatus is obtained, having the gimbal mechanism 2 of highly improved flexural rigidity in the positioning direction or in the direction X, without interfering the pitching and rolling movements of the magnetic head slider 1 about the X and Y-axes. The slits 8 may be formed each on both sides of the spring part as shown in FIG. 6, or may be in the form of a slot in the spring part as shown in FIG. 7 or in any other shapes.

Figure 5:
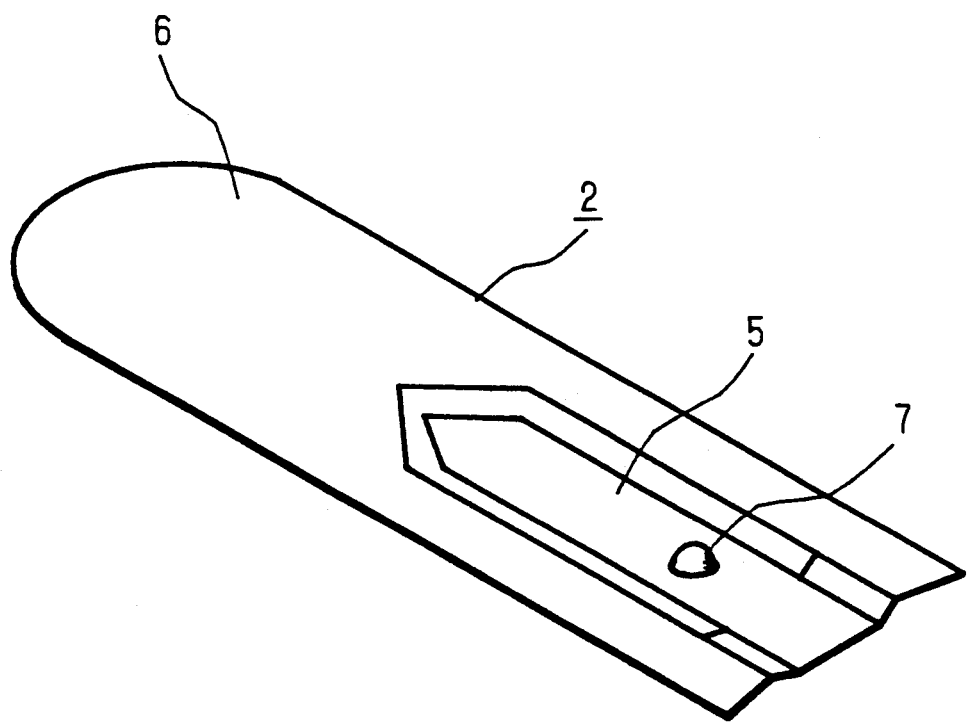
FIG. 5 is an explanatory view showing the other example of a deformed gimbal mechanism in a prior art magnetic head supporting apparatus.
Figure 5:
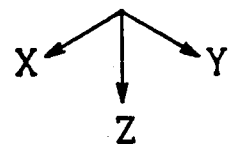
Figure 8:
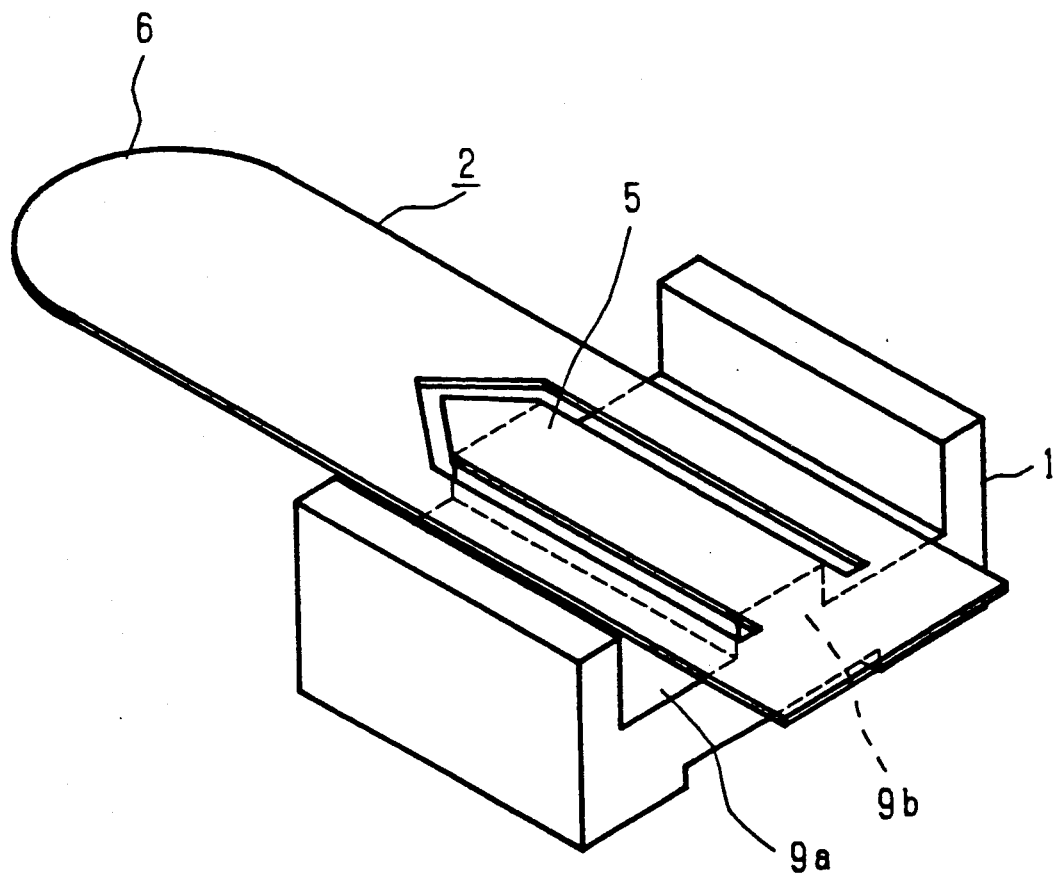
FIG. 8 is a perspective view showing a gimbal mechanism and a magnetic head slider of a magnetic head supporting apparatus according to another embodiment of the present invention.

Another embodiment of the present invention is shown in FIG. 8 which is a perspective view showing the gimbal mechanism 2 and magnetic head slider 1. Referring to FIG. 8, reference numerals, 9a and 9b indicate concaved portions and a convex portion formed in the magnetic head slider 1. The step difference between the concaved portion and convex portion is determined to exceed the torsional amplitude of the gimbal mechanism 2. When the first fixed part 5 is fixed to the convex portion 9b, the spring part 2a between the firs and second fixed parts 5, 6 is opposed to the concaved portions 9a of the magnetic head slider 1. In the present embodiment, the first fixed part 5 is prevented from being pushed out by pressing as is the case shown in FIG. 5, and the first and second fixed parts 5, 6 of the gimbal mechanism 2 can be brought substantially on the same plane. Thus, even when the force is applied in the direction X at positioning of the magnetic head slider 1, the torsional force generated at this time can be reduced and the rigidity in the direction X can be increased in comparison with the prior art.

In addition, the concaved portions 9a are provided in the magnetic head slider in the position opposite to the gimbal mechanism 2 other than the first fixed part 5 so that the gimbal mechanism 2 is not in contact with the slider 1. As a result, in the magnetic head supporting apparatus according to the present embodiment, the flexural rigidity in the positioning direction of the gimbal mechanism 2 can be enhanced and a stable dynamic characteristic can be obtained, without interfering the pitching and rolling movements of the magnetic head slider 1 in the radial direction of the magnetic disc.

In the embodiment described above, though the convex portion 9b is formed in the magnetic head slider 1 such that the first fixed part 5 of the gimbal mechanism is covered all over the surface thereof, it may be formed partly to cover the first fixed part 5.

Though both the convex portion 9b and concaved portions 9a are formed, it brings out the same effects that only a convex portion is formed in the prior art magnetic head slider in a position opposite to the first fixed part 5.

In the magnetic head supporting apparatus according to a first embodiment of the present invention, there are provided a magnetic head slider mounted with a magnetic head movable in a direction radial to a magnetic disc, a load beam elongated in the circumferential direction of the magnetic disc and pressing the magnetic head slider toward the magnetic disc, and a gimbal mechanism having a first fixed part secured to the magnetic head slider and a second fixed part secured to the load beam, and which supports the magnetic head slider at a pivot in contact with the load beam as a fulcrum for pitching and rolling movements in the radial direction of the magnetic disc. The width of the gimbal mechanism in the radial direction of the magnetic disc is increased and slits are formed in the spring part between the first and second fixed parts, so that the flexural rigidity of the gimbal mechanism in the positioning direction can be increased and a stable dynamic characteristic can be obtained, without interfering the pitching and rolling movements of the magnetic head slider in the radial direction of the magnetic disc.

According to another embodiment of the present invention, by providing the convex portion and concaved portions in the magnetic head slider and bringing the first and second fixed parts of the gimbal mechanism 2 onto the same plane, similar to the first embodiment, the flexural rigidity of the gimbal mechanism in the positioning direction can be increased and a stable dynamic characteristic can be obtained, without interfering with the pitching and rolling movements of the magnetic head slider in the radial direction of the magnetic disc.

In the following, other modified embodiments of the present invention will be described.

A magnetic head supporting apparatus according to a further embodiment of the present invention will be described with reference to FIG. 9, which is an exploded perspective view showing essential portions of the apparatus and in which an end part of the magnetic head supporting apparatus is enlarged and exploded in the direction Z. Referring to this FIG. 9, a nonskid means 20 as a restricting means is provided on an end portion of pivot 7 for increasing the frictional force between the load beam 4 and the pivot 7 than in the ordinary contacting condition, which nonskid means 20 is made of, for example, silicon rubber fixed to the pivot 7 by adhesion, etc.

Figure 9:
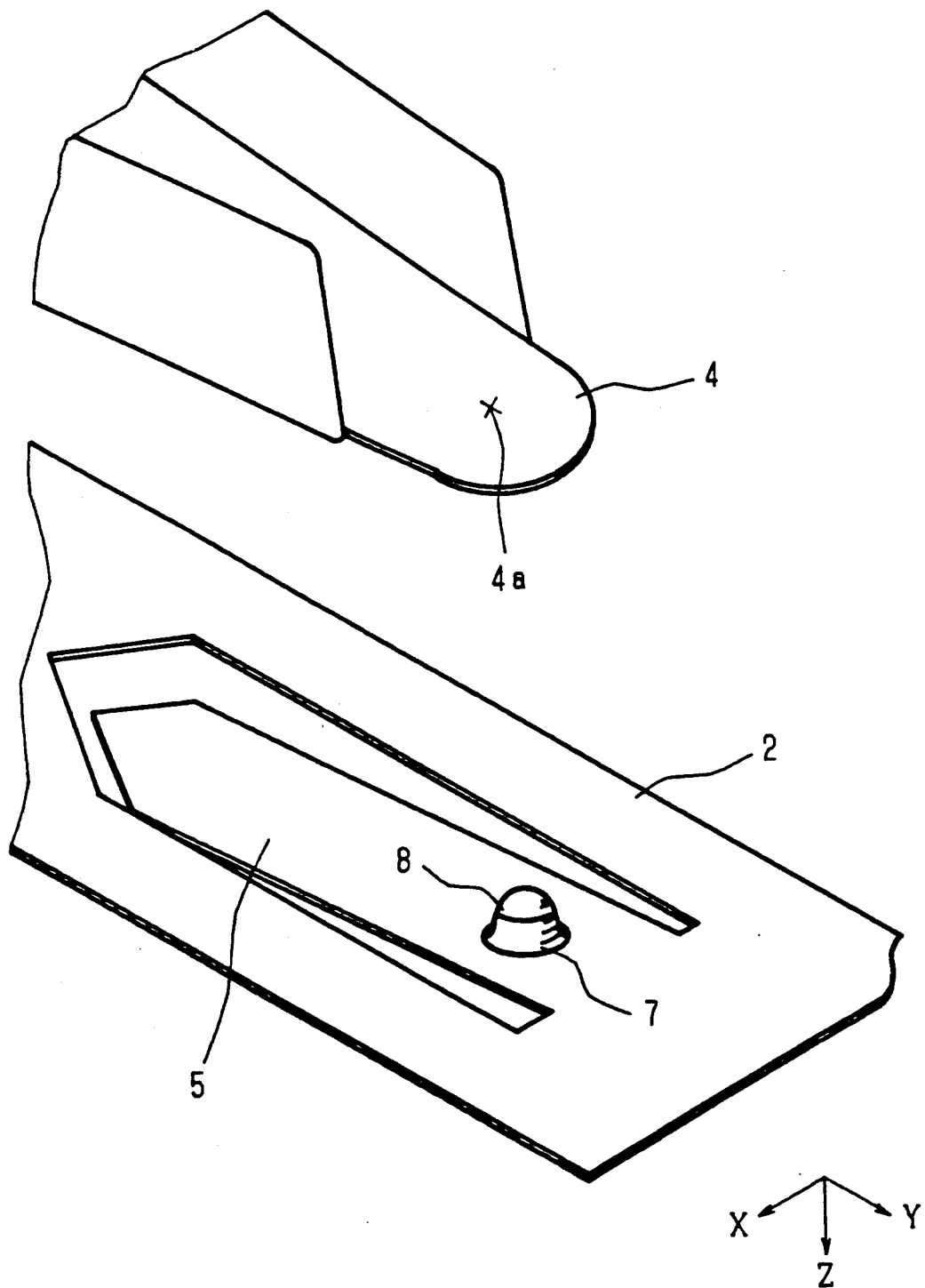
FIG. 9 is an exploded perspective view showing essential portions of a magnetic head supporting apparatus according to a still another embodiment of the present invention, wherein the essential portions are enlarged and exploded in a direction perpendicular to the magnetic disc surface.

In the magnetic head supporting apparatus of FIG. 9, the pivot 7 is in contact with the load beam 4 via the nonskid means 20, and the magnetic head slider 1 is supported such that it can perform pitching and rolling movements about X and Y-axes at the fulcrum of the pivot 7. In the in-line type, since the head is moved at high speeds in the direction X, the gimbal mechanism 2 is affected by a bending force and the pivot 7 is applied with the force in the direction X. As the nonskid means 20 is made of a material having a friction coefficient larger than that between the pivot 7 and the load beam 4, the frictional force is increased by the nonskid means 20 to prevent the sideslip of the pivot 7 in the direction X. The pivot 7 is substantially in the same configuration as the conventional one since it satisfies the conventional function as a pivot. The nonskid means 20 may be made of any other materials, not limited to silicon rubber, such as metal or plastic as far as it has large friction coefficient. Moreover, the nonskid means 20 can also be mounted by other methods than adhesion, e.g., the evaporation, surface coating, impregnation, welding etc. In FIG. 9, though the nonskid means 20 is provided on the side of the pivot 7, it may be formed on the side of the load beam 4 or on both sides.

Figure 10:
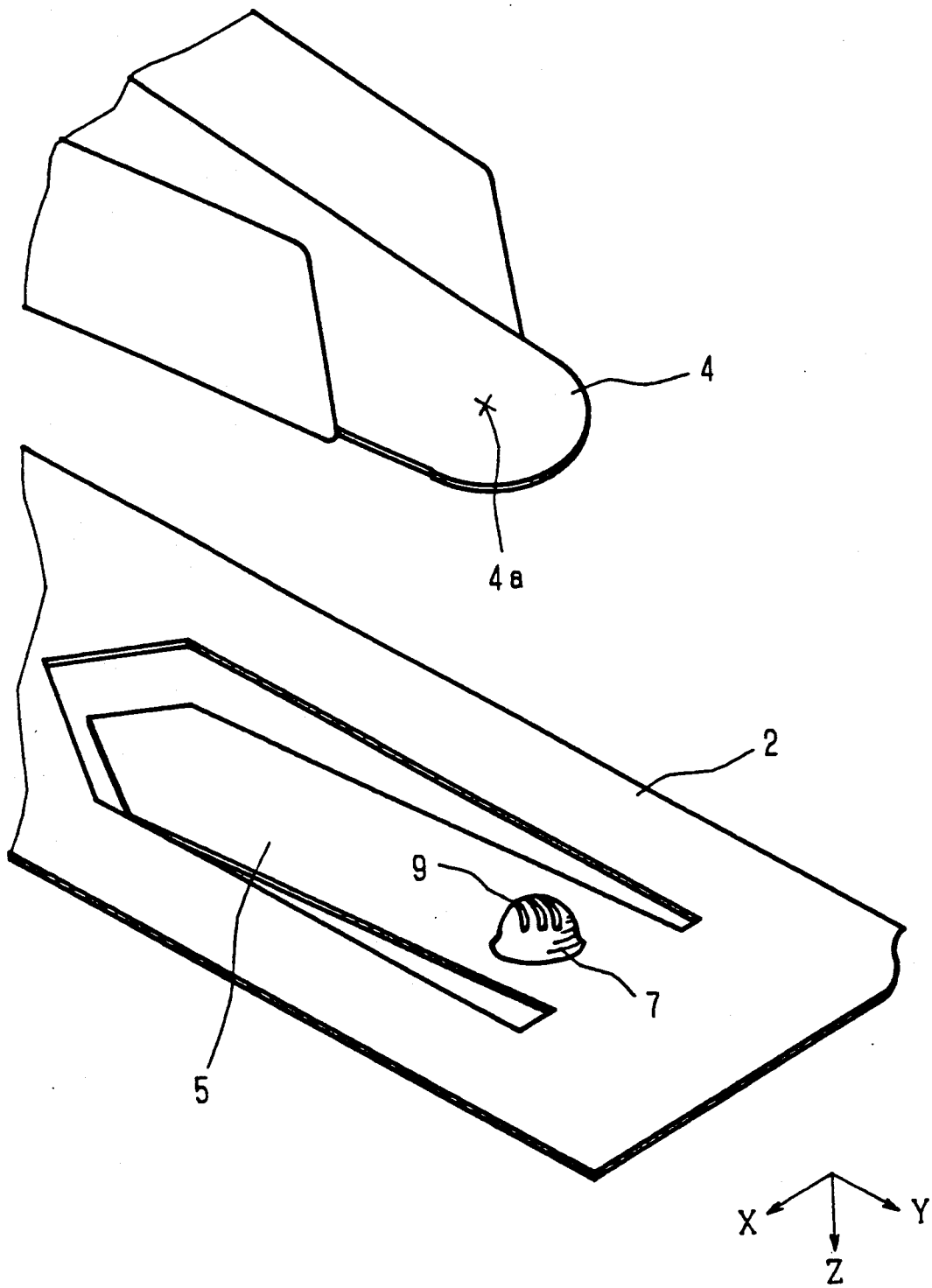
FIG. 10 is an exploded perspective view showing essential portions of a modified magnetic head supporting apparatus according to the still another embodiment of the present invention.

FIG. 10 is an exploded perspective view showing essential portions of a magnetic head supporting apparatus according to a modified embodiment of the present invention. In FIG. 10, rough cuttings 9 are formed at an end portion of the pivot 7 so as to increase the frictional force between the load beam 4 and pivot 7 than in the ordinary contacting condition. It may be formed, for example, by scratching the end portion of the pivot 7.

Also in this modified embodiment, similar to in the aforesaid embodiment, the frictional force between the pivot 7 and the load beam 4 is increased relative to the ordinary contacting condition thereby to prevent the sideslip of the pivot 7 in the direction X. The rough cuttings 9 are minute scratches and the like while maintaining the basic shape of the pivot to satisfy the conventional function as a pivot. The rough cuttings or scratches 9 may be formed on the side of the load beam 4 or on both sides. Furthermore, it is not essential that the rough cuttings 9 be directional, but it is more effective if the rough cuttings 9 be formed with anisotropy to have a larger frictional force only in the direction X.

It is also possible to apply powdery materials on the pivot 7 or the load beam 4.

Figure 11:
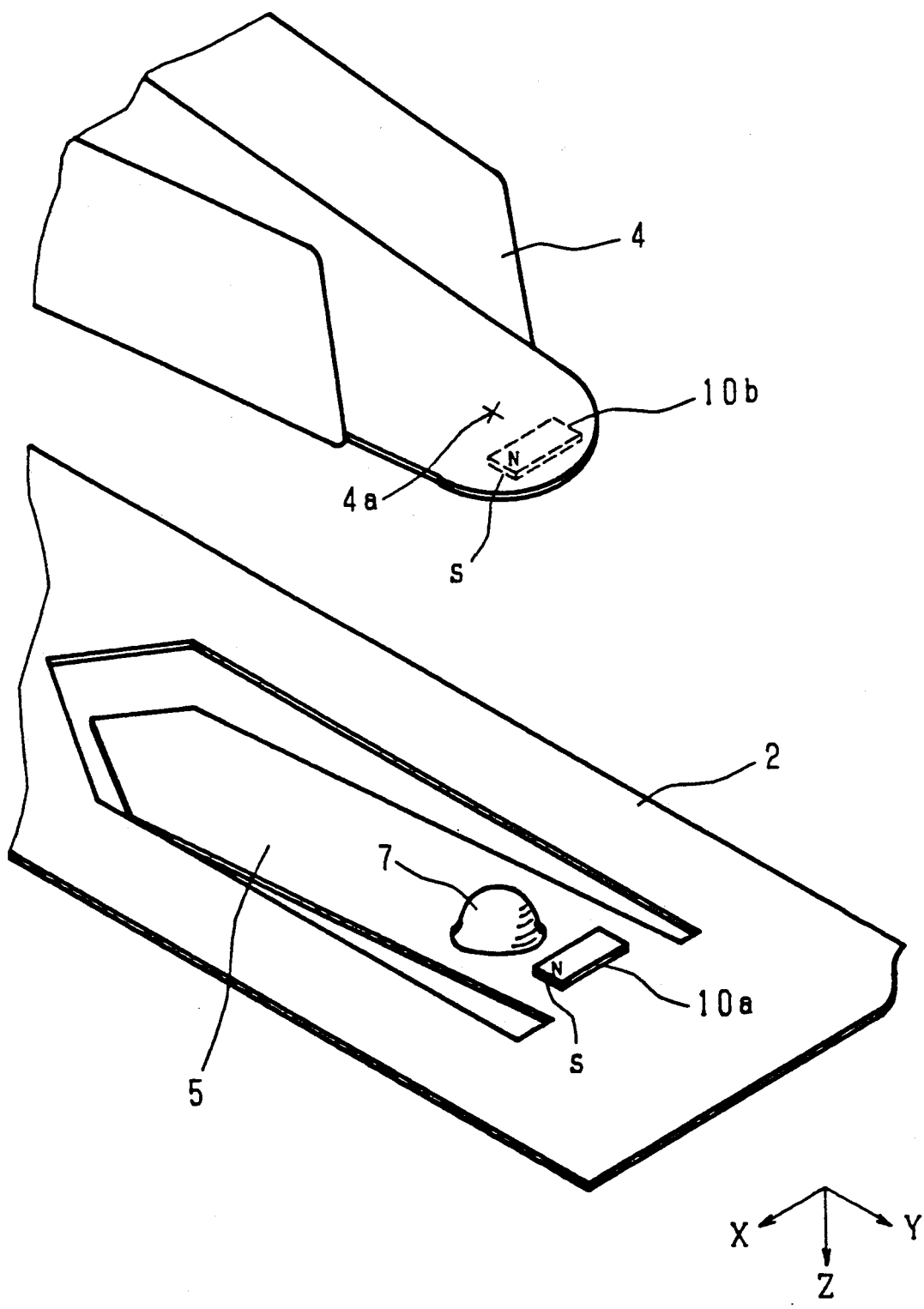
FIG. 11 is an exploded perspective view showing essential portions of a modification of a magnetic head supporting apparatus according to the still another embodiment of the present invention, FIGS. 12(a), (b) through FIGS. 14(a), (b) are respectively exploded perspective views and side elevational views of essential portions of a modified magnetic head supporting apparatus according to the still another embodiment of the present invention, and FIGS. 15(a), (b) are an exploded perspective view and a cross sectional view showing essential portions of a modification of a magnetic head supporting apparatus according to the still another embodiment of the present invention.

FIG. 11 is an exploded perspective view showing essential portions of a magnetic head supporting apparatus according to a modified embodiment of the present invention. In FIG. 11, a pair of permanent magnets 10a, 10b are provided on the gimbal mechanism 2 and the load beam 4 so that the gimbal mechanism and the load beam are attracted to each other.

By providing the permanent magnets 10a, 10b respectively on the gimbal mechanism 2 and the load beam 4, the pressing force is increased and the frictional force between the pivot 7 and the load beam 4 is made larger than in the ordinary contacting condition. Thus, similar to in the aforementioned embodiments, even when the magnetic head slider is moved at high speeds in the direction X, and the gimbal mechanism 2 is influenced by the bending force to press the pivot 7 in the direction X, the sideslip of the mechanism 2 can be avoided.

It is to be noted here that the permanent magnets 10a, 10b are formed lower than the pivot 7 and may also be provided in the magnetic head slider 1, not in the gimbal mechanism 2, or in both. Each of the permanent magnets 10a, 10b may be comprised of an electromagnet or the like as far as it is attractive and in any shape and material. Moreover, if the attractive force can be obtained by the material of the magnetic head supporting apparatus itself, the magnet may be provided only on one side.

Figure 12A:
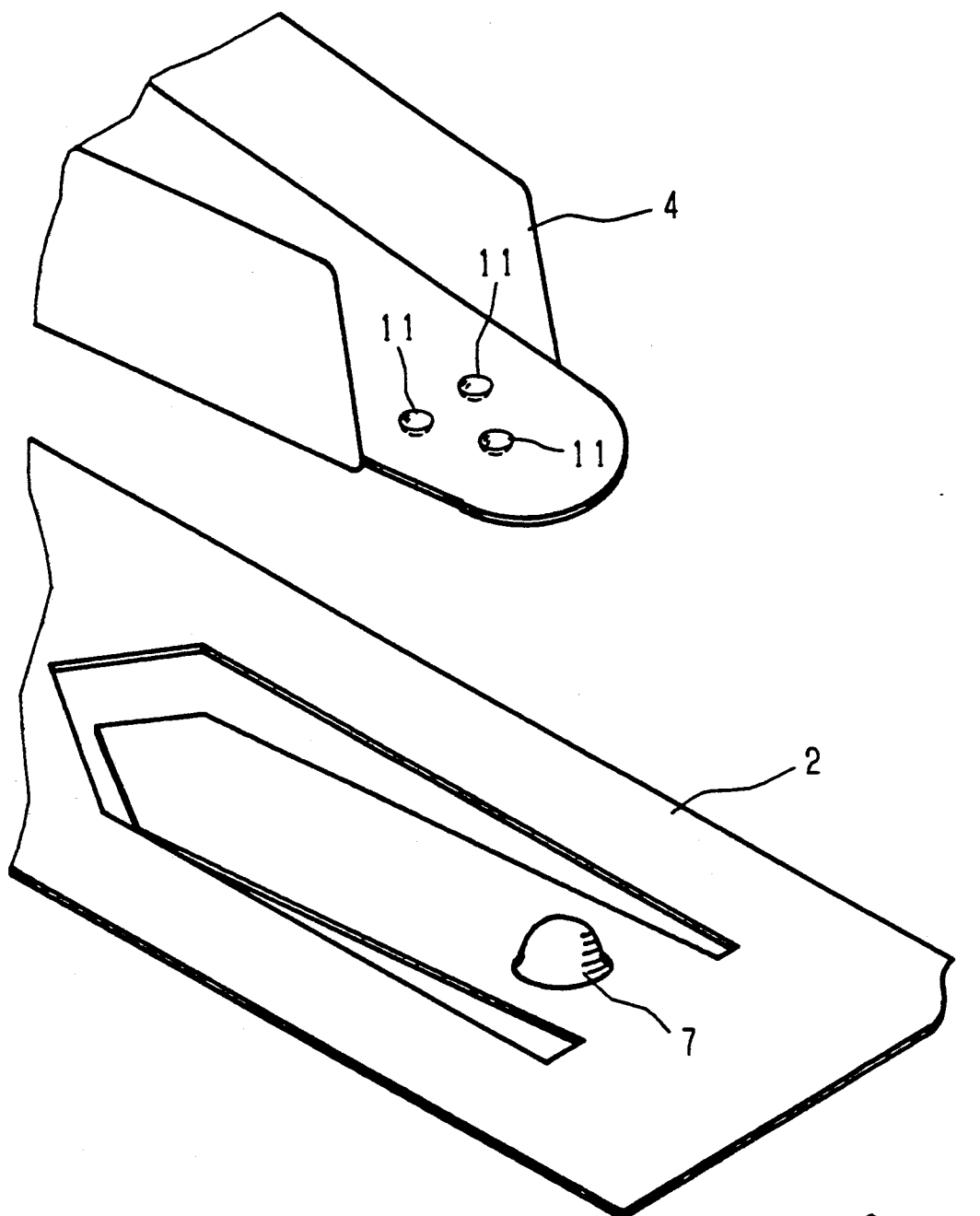
Figure 12B:
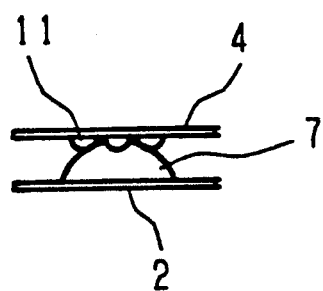
Figure 12B:
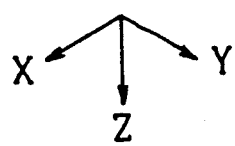
Figure 13A:
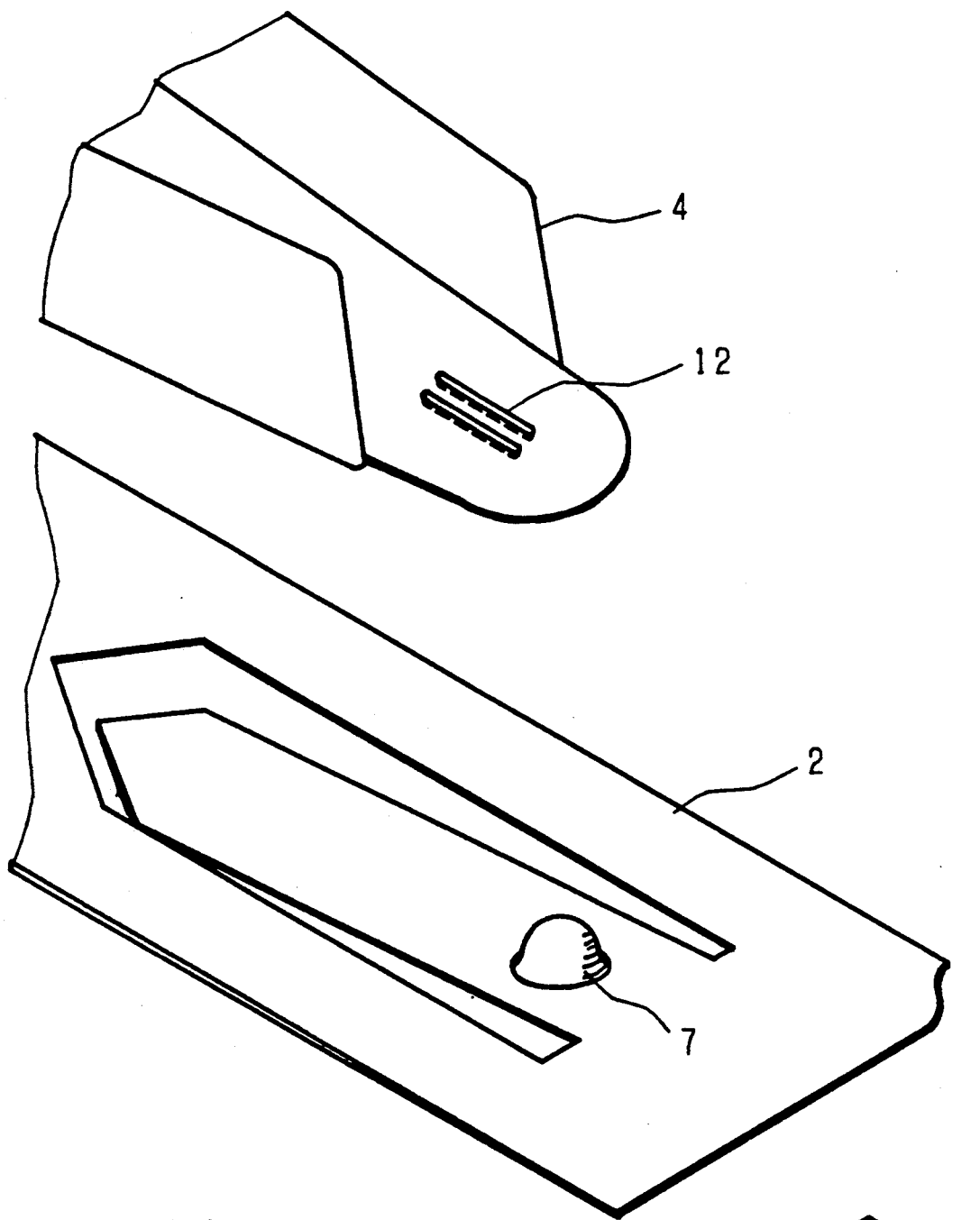
Figure 13B:
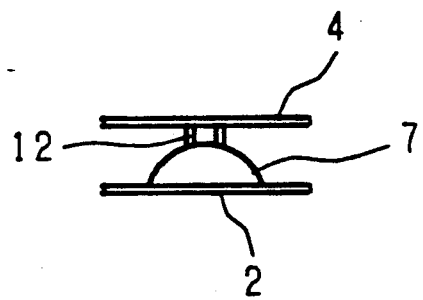

FIG. 12 shows a still further modified embodiment of the present invention. FIG. 12(a) is an exploded perspective view showing essential portions of a magnetic head supporting apparatus, and FIG. 12(b) is a side view showing central essential portions seen from an end portion. In the supporting apparatus of FIG. 12, three protrusions 11 are formed in the load beam 4 in a manner to circumscribe the pivot 7 formed by, for example, a curved surface having the radius of curvature. The protrusions 11 are so formed that the tip of the pivot 7 does not abut against the surface plate of the load beam 4 and their height is not larger than that of the pivot 7. When a force is applied to the pivot 7 to cause the latter to slip sideways, the magnetic head slider 1 is depressed toward the magnetic disc because of the pressing force of the protrusions 11 to slightly press the air spring. A reaction force is brought about in the air spring against the depressing force, and therefore the pivot 7 is pressed back to the normal position and the sideslip is prevented. The number of the protrusions is not limited to three, two or more protrusions may be enough to be provided in the radial direction of the magnetic disc. For example, as shown in FIGS. 13(a), (b), two protrusions 12 may be formed in parallel relation to each other in the direction Y.

On the other hand, it is also possible to form the contact point of the load beam 4 into the curved surface and provide two or more protrusions in the pivot 7.

Figure 14A:
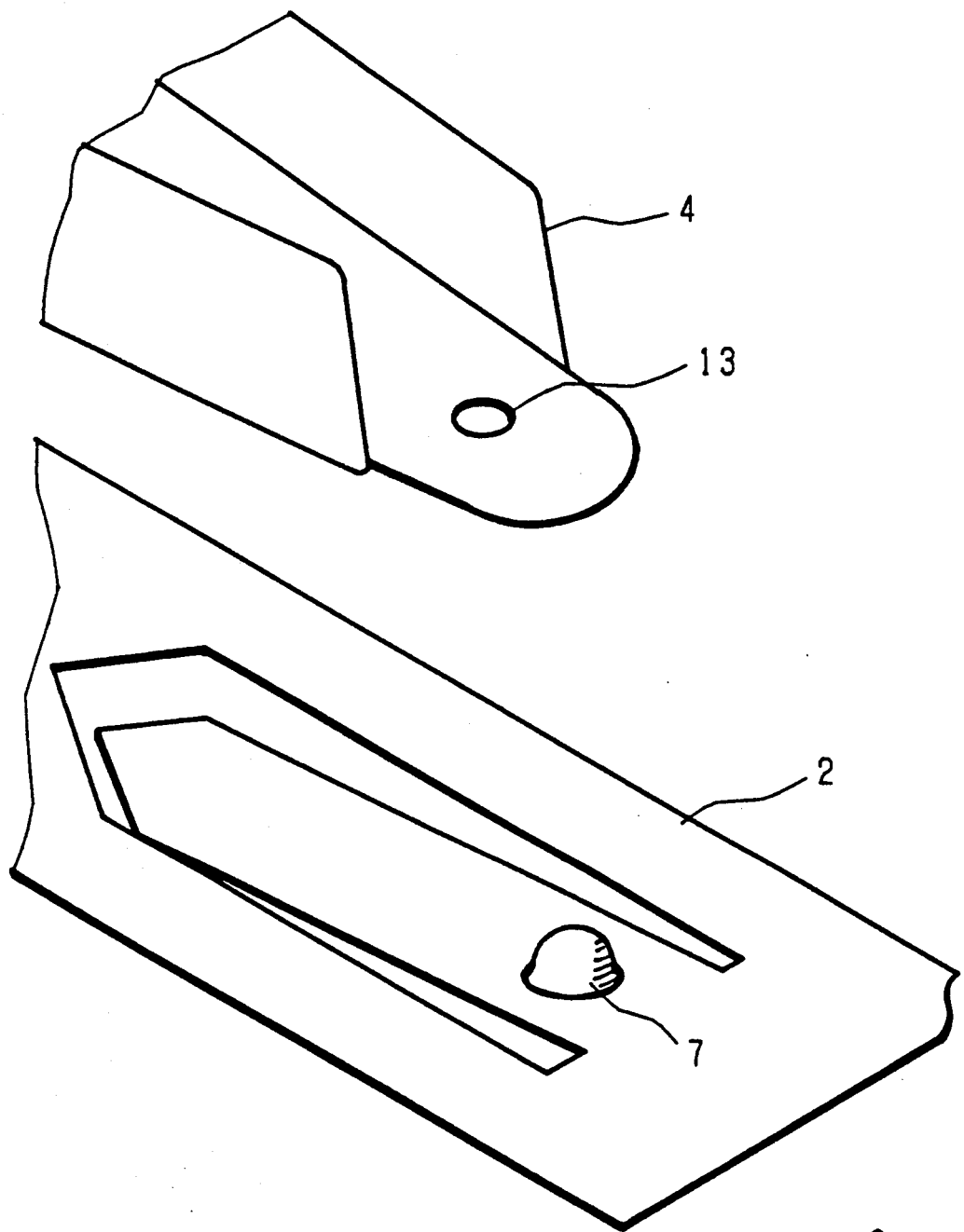
Figure 14B:
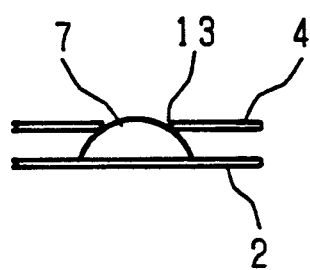
Figure 14B:
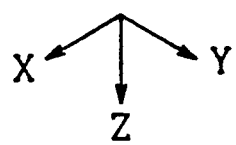

FIG. 14 shows a magnetic head supporting apparatus according to yet another modification of the present invention. FIG. 14(a) is an exploded perspective view showing essential portions of the magnetic head supporting apparatus, and FIG. 14(b) is a side view showing central essential portions seen from an end portion. Referring to FIG. 14, there is formed a hole 13 in the load beam 4 where the load beam contacts with the gimbal mechanism, having a diameter smaller than the maximum diameter of the protruded part of the pivot 7. Because of the hole 13, when a force causing the sideslip of the pivot is applied to the pivot 7, the pivot 7 is engaged into the hole 13 and the magnetic head slider 1 is depressed against the magnetic disc by the depressing force in the inner circumference of the hole 13, thereby to slightly press the air spring. A reaction force is generated in the air spring against the depressing force, and the pivot 7 is consequently pressed back to the normal position and the sideslip is prevented.

Figure 15A:
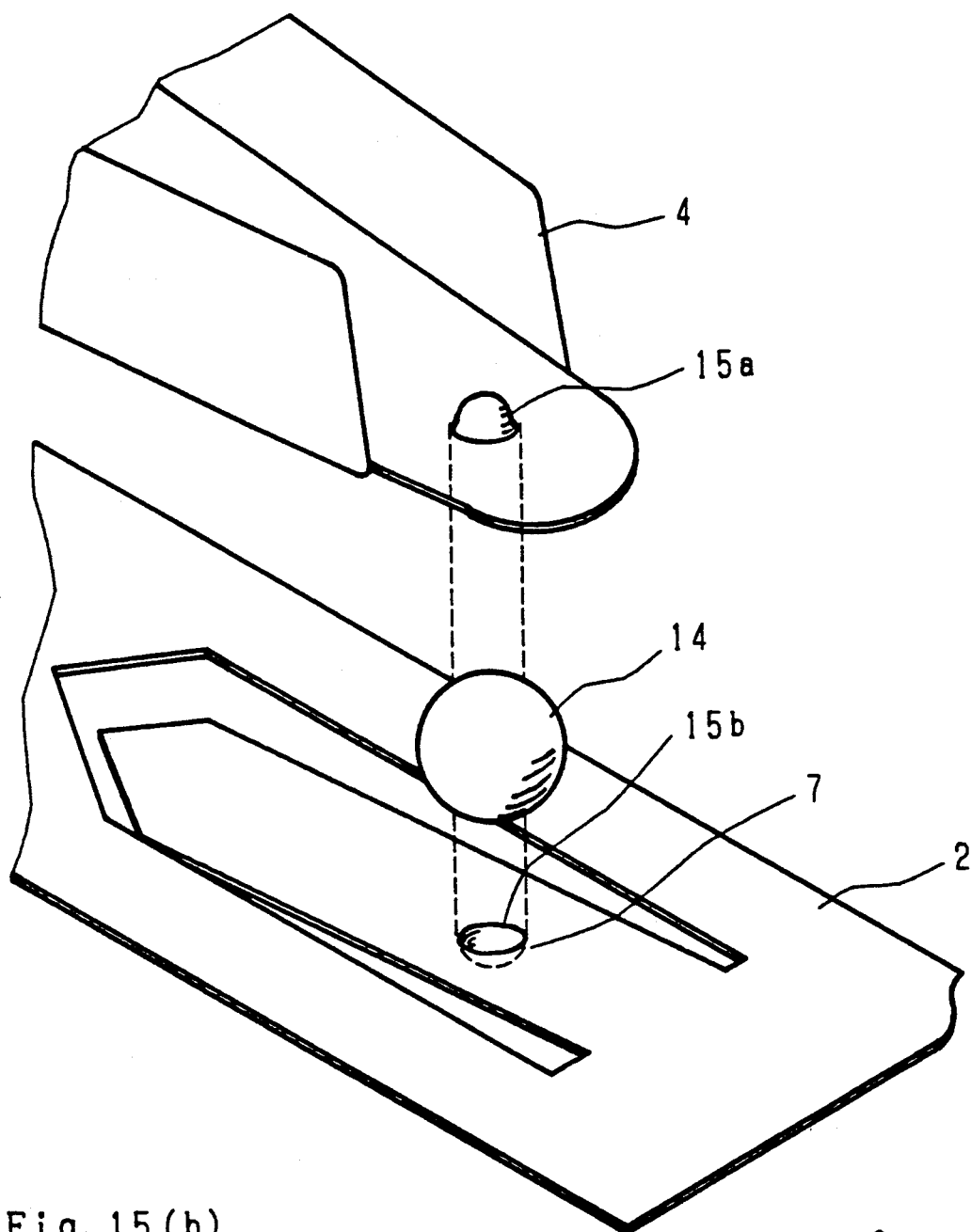
Figure 15B:
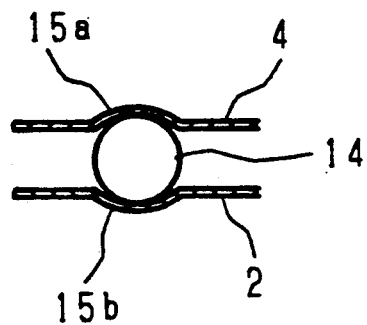

FIG. 15 shows a magnetic head supporting apparatus according to a yet further modification of the present invention. FIG. 15(a) is an exploded perspective view showing essential portions of the magnetic head supporting apparatus, and FIG. 15(b) is a sectional view showing central essential portions when the pivot is cut in the direction X. In FIG. 15, reference numeral 14 is a ball having an extremely small diameter and provided between the gimbal mechanism 2 and the load beam 4. In the load beam 4 and the gimbal mechanism 2 where they are contacted with the ball 14, depressions 15a, 15b are formed at respective opposed positions. The depressions 15a, 15b, formed respectively in the load beam 4 and gimbal mechanism 2, have the diameter not exceeding that of the ball 14 and the depth not larger than the radius of the ball 14, holding the ball 14 therebetween. When a force causing the sideslip of the pivot is applied to the pivot 7, the magnetic head slider 1 is pressed against the magnetic disc by the pressing force inside the depressions 15a, 15b, thereby to slightly press the air spring. A reaction force is generated in the air spring against the pressing force, whereby the pivot 7 is pressed back to the normal position and the sideslip is prevented. The depressions 15a and 15b may be circular or square to accommodate the ball 14 therein. It is also possible to define a hole in the gimbal mechanism 2 and form a curved surface having the radius of curvature in the load arm 4.

Thus, in any modified embodiments described hereinabove, by the increase in the restricting force between the load beam 4 and the pivot 7 in the fast moving direction, the sideslip of the pivot 7 in the fast moving direction can be prevented and the dynamic characteristic of the magnetic head supporting apparatus can be stabilized.

As described above, according to the modified embodiment of the present invention, the magnetic head supporting apparatus is comprised of a magnetic head slider mounted with a magnetic head moving in a radial direction of a magnetic disc, a load beam elongated in the circumferential direction of the magnetic disc and pressing the magnetic head slider toward the magnetic disc, and a gimbal mechanism supporting the magnetic head slider at a pivot in contact with the load beam as a fulcrum for pitching and rolling movements in the radial direction of the magnetic disc. Since there is further provided a mechanism for increasing the frictional force between the load beam and pivot in the moving direction of the magnetic head to be larger than in the contacting condition, the magnetic head supporting apparatus displays stabilized dynamic characteristic, with preventing the sideslip of the pivot in the moving direction even when the magnetic head slider is moved at high speeds and without interfering the pitching and rolling movements of the magnetic head slider in the radial direction of the magnetic disc.

According to the other modification of the present invention, by forming either are of the contact portion of the load beam and the pivot into a curved surface having a radius of curvature, and providing at least two or more protrusions projecting toward the one in the other one in the radial direction of the magnetic disc, such that the load beam presses the magnetic head slider subsequent to the contact between the curved surface and the protrusions, the sideslip of the pivot can be prevented and the magnetic head supporting apparatus realizes stabilized dynamic characteristic.

Furthermore, according to the still further modification of the present invention, by forming either one of the contact portion of the load beam and the pivot into a curved surface having a radius of curvature, and providing a hole in which the curved surface can be engaged in the radial direction of the magnetic disc in the other one, the sideslip of the pivot can be prevented and the magnetic head supporting apparatus displays stabilized dynamic characteristic.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A magnetic head supporting apparatus comprising:
   a magnetic head slider opposite to a magnetic disc and having a magnetic head movable in a radial direction of said magnetic disc;
   a load beam disposed lengthwise in a circumferential direction of said magnetic disc, and pressing said magnetic head slider toward said magnetic disc;
   a gimbal mechanism including a first fixed part secured to said magnetic head slider, a second fixed part secured to said load beam, and a spring part having a predetermined width, connecting said first and second fixed parts, which supports said magnetic head slider for pitching and rolling movements in said radial direction;
   a convex portion including a tip formed on one of said load beam and said first part, said convex portion being a contact between said first fixed part and said load beam as a fulcrum for pitching and rolling movements of said gimbal mechanism; and
   a restricting means for restricting the movement of said convex portion in said radial direction wherein said restricting means includes a frictional force applying means for increasing the frictional force at said fulcrum between said load beam and said first fixed part, in said radial direction;
   wherein said frictional force applying means includes silicon rubber adhered to the tip of said convex portion.

* * * * *